United States Patent [19]

Nakano et al.

[11] Patent Number: 4,723,217
[45] Date of Patent: Feb. 2, 1988

[54] APPARATUS FOR OUTPUTTING A CHARACTER COMPOSED OF BASIC SYMBOLS

[75] Inventors: Mitsumasa Nakano; Osamu Kawaguchi, both of Tokyo, Japan

[73] Assignee: Oki Electric Industry Co., Ltd., Tokyo, Japan

[21] Appl. No.: 746,846

[22] Filed: Jun. 20, 1985

[30] Foreign Application Priority Data

Jun. 25, 1984 [JP] Japan ................................ 59-129235

[51] Int. Cl.$^4$ ........................ G06F 15/66; G06F 3/12; G06U 15/02
[52] U.S. Cl. .................................. 364/518; 340/721; 364/519; 400/110; 400/484
[58] Field of Search ............... 364/518, 519, 520, 521, 364/523; 340/721, 723, 365 R; 400/110, 484

[56] References Cited

U.S. PATENT DOCUMENTS

| | | | |
|---|---|---|---|
| 3,852,720 | 12/1974 | Park | 400/110 |
| 4,144,405 | 3/1979 | Wakamatsu | 400/110 |
| 4,187,031 | 2/1980 | Yeh | 400/110 |
| 4,251,871 | 2/1981 | Yu | 400/110 |
| 4,327,421 | 4/1982 | Wang | 400/110 |
| 4,379,288 | 4/1983 | Leung et al. | 400/110 |
| 4,408,199 | 10/1983 | White et al. | 340/723 |
| 4,490,789 | 12/1984 | Leban et al. | 364/518 |
| 4,559,615 | 12/1985 | Goo et al. | 400/110 |

Primary Examiner—Errol A. Krass
Assistant Examiner—Daniel W. Juffernbruch
Attorney, Agent, or Firm—Wenderoth, Lind & Ponack

[57] ABSTRACT

A character composed of basic symbols such as a Korean character is outputted by an apparatus so as to adjust to an outputted design or outputted design alteration. The apparatus includes an input device for inputting a plurality of binary codes, each binary code corresponding to a respective one of the basic symbols; an output device for outputting the character; a detecting circuit for detecting an indication code for supplying a space character from among the binary codes; a first calculating circuit for calculating the number of basic symbols; a converting circuit for converting the number of characters into a number of outputted units with respect to the size of the basic symbols; a second calculating circuit for calculating the supplying number of space characters by subtracting the number of outputted units from the number of basic symbols; and a supplying circuit for supplying a space character code to the output device, the number of space character codes being equivalent to the supplying number, the supplying circuit operated on or after an indication code has been detected by the detecting circuit. It is possible for the apparatus to output an output data representing Korean characters, space characters and other basic symbols, the output data being in accordance with an input data representing Korean alphabet symbols and other basic symbols.

18 Claims, 5 Drawing Figures

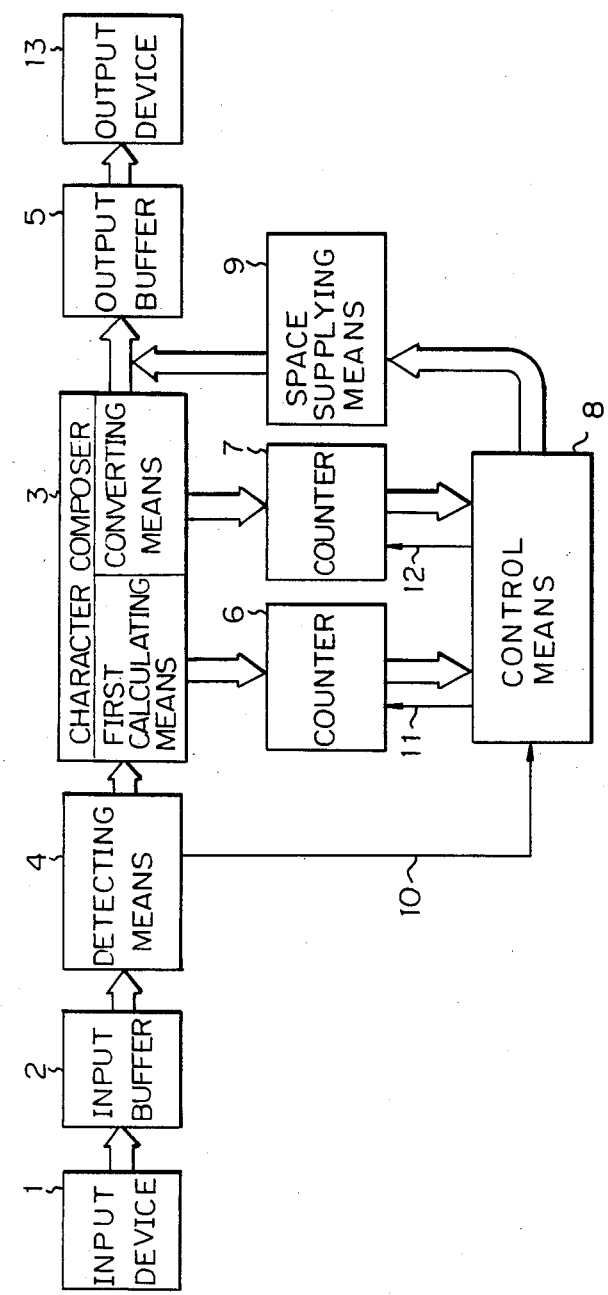

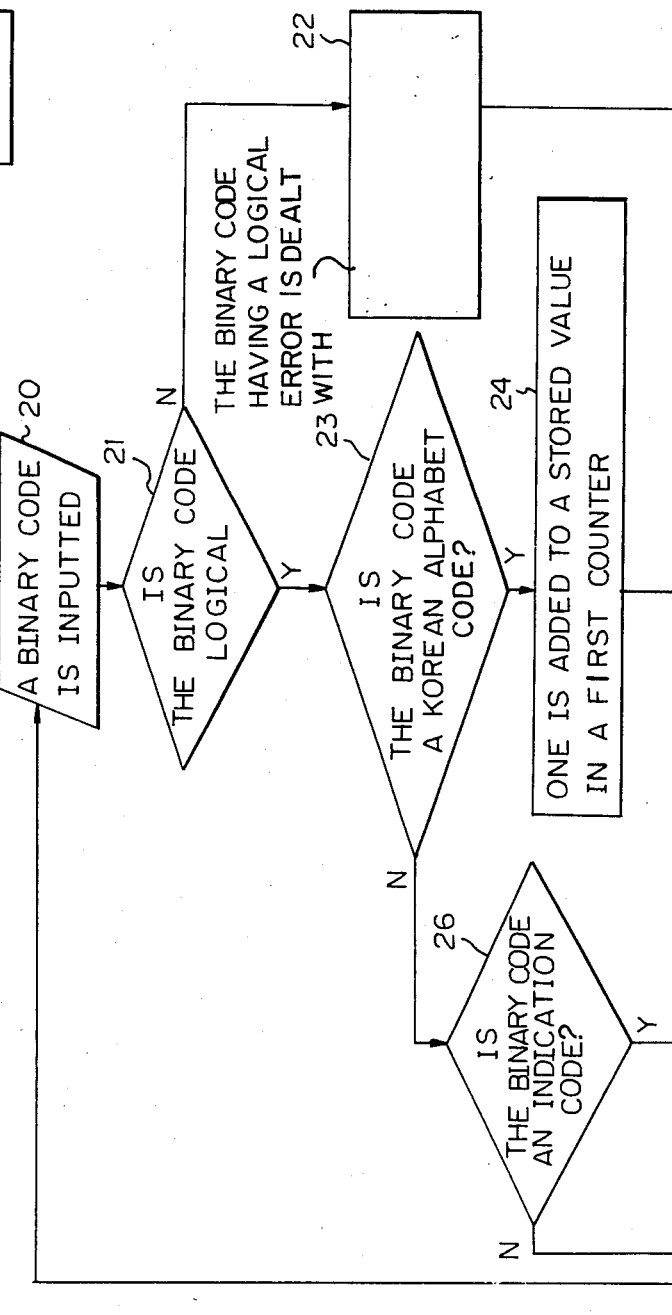

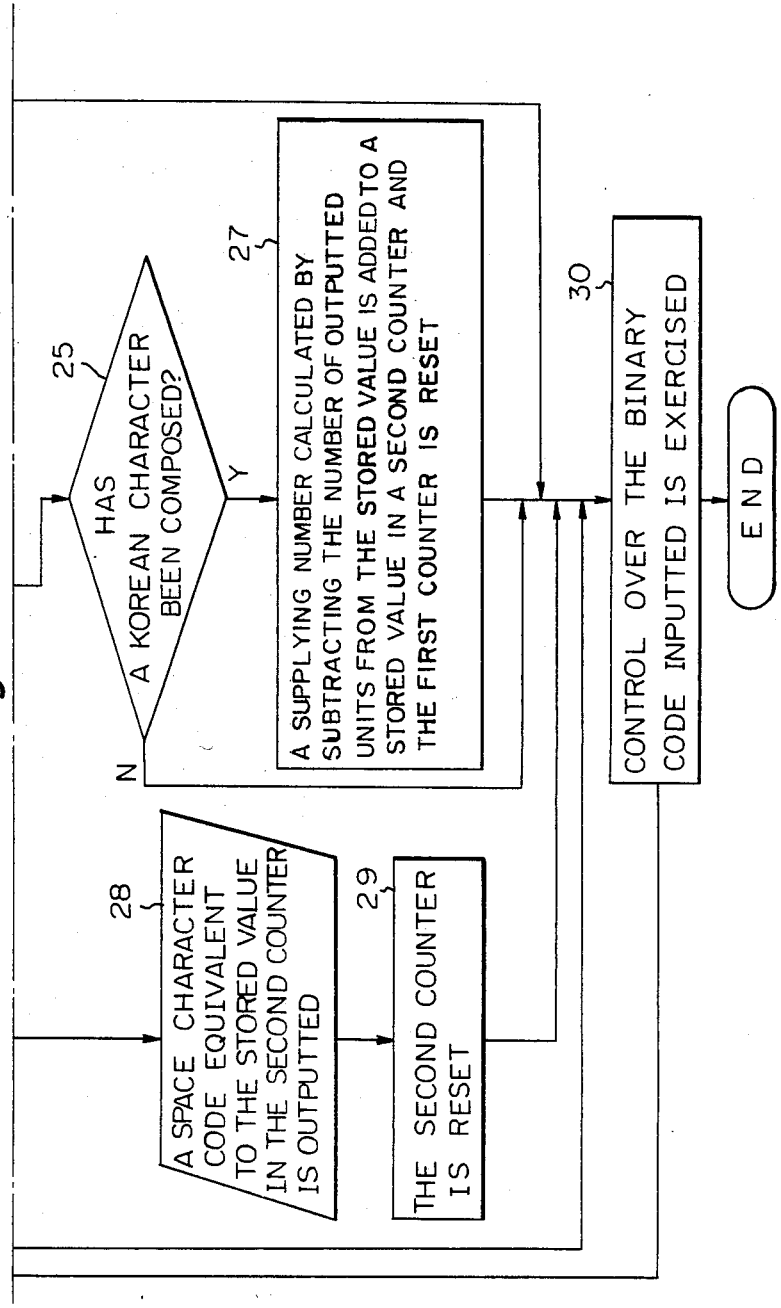

APPARATUS FOR OUTPUTTING A CHARACTER COMPOSED OF BASIC SYMBOLS

BACKGROUND OF THE INVENTION

1. Field of the Invention

The present invention is related to an apparatus for outputting a character composed of basic symbols, and particularly to an apparatus for outputting a Korean character composed of a plurality of Korean alphabet symbols.

2. Description of the Prior Art

The Korean character consists of a combination of a plurality of Korean alphabet symbols. In an apparatus for outputting the Korean character, the combination of Korean alphabet symbols is determined by a logic circuit based upon rules of composition from a Korean alphabet code sequentially inputted by an input device such as a computer or a keyboard, the Korean alphabet code corresponding to each of Korean alphabet symbols. An example of an apparatus for outputting a Korean character composed of Korean alphabet symbols is described in U.S. Pat. No. 3,852,720 to Park.

As mentioned above, a Korean character font corresponding to a Korean character can be generated and fed to an output device such as a display unit or a printer by a determination of the combination of the Korean alphabet symbols.

A size of the Korean character font is generally twice as large as a size of a space character which is a fundamental size being identical with that of basic symbols such as A, B, C, ..., a, b, c, ..., or Korean alphabet symbols.

The conventional apparatus described above generates a decrease in an outputted width which is equivalent to the number of Korean characters as compared with an inputted width which is equivalent to the number of Korean alphabet symbols.

In FIG. 1, output data representing Korean characters and basic symbols which are not a Korean alphabet symbol is outputted with a decrease of two units which is equivalent to a width of two basic symbols as compared with the inputted width of input data representing Korean alphabet symbols and other basic symbols.

It is difficult to estimate the rate of the decrease on inputting the input data because the rate is changed in dependence upon the rules of composition.

Accordingly, the change of the rate places an obstacle to the design or the design alteration of outputted characters in a case of outputting Korean characters mixed with other basic symbols.

SUMMARY OF THE INVENTION

It is an object of the present invention to provide an apparatus which has removed the obstacle to the design or the design alteration of outputted characters in a case of outputting Korean characters mixed with other basic symbols.

It is another object of the present invention to provide an apparatus for outputting Korean characters with units of output data in accordance with units of input data.

It is an advantage of the present invention to provide an apparatus for outputting Korean characters which easily adjusts the Korean characters with respect to their design or design alteration.

An apparatus for outputting Korean characters respectively composed of a plurality of Korean alphabet symbols to an output device, comprising:

an input device for sequentially inputting a plurality of binary code signals, said binary code signals respectively Korean alphabet code signals and respectively designating the Korean alphabet symbols and an indication code signal for supplying a space character code signal;

a detecting means for detecting the indication code signal from among the binary code signals;

a first calculating means for calculating the number of Korean alphabet code signals inputted from the input device;

a character composing means for composing Korean character code signals from the inputted Korean alphabet code signals, the Korean character code signals respectively designating Korean characters, the Korean character code signals being outputted to the output device;

a second calculating means for calculating a supplying number of space character code signals, the supplying number being calculated by subtracting the number of composed Korean character code signals from the inputted number of Korean alphabet code signals; and a supplying means for supplying a space character code signal to the output device, the number of space character code signals being equal to the supplying number, the supplying means supplying the space character code signal when the indication code signal is detected by the detecting means.

The above and other advantages of the invention will become more apparent from the following description and the accompanying drawings.

BRIEF DESCRIPTION OF THE DRAWINGS

FIG. 2 illustrates a block diagram of a preferred embodiment of the present invention;

FIG. 3, consisting of FIGS. 3A and 3B, illustrates a flowchart of an alternative preferred embodiment of the present invention.

DESCRIPTION OF THE PREFERRED EMBODIMENT

Figure 1:
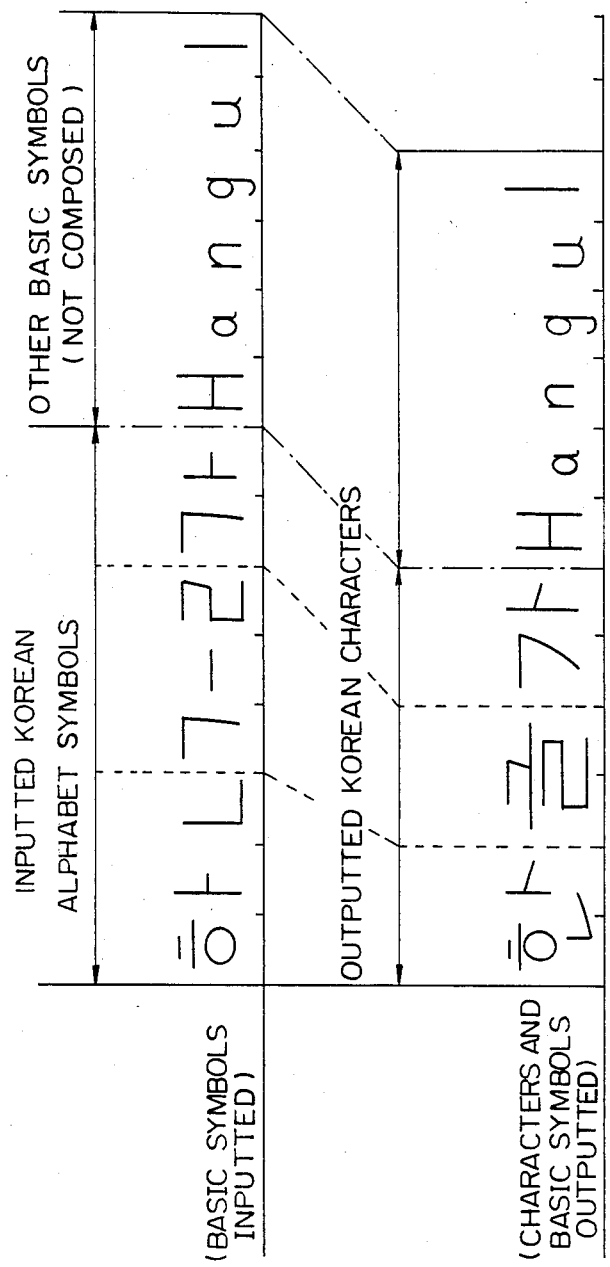
FIG. 1 illustrates the input data and the output data of a prior art apparatus.

A block diagram of an apparatus for outputting a Korean character composed of Korean alphabet symbols which adjust the Korean character with respect to design and design alteration is illustrated in FIG. 2.

An input device 1 such as a computer or a keyboard is used to generate a binary code representing an alphabet code corresponding to each of the basic symbols and an indication code for supplying a space character, the binary codes generally consisting of one byte; the input device 1 sequentially inputs the binary code to an input buffer 2.

The input buffer 2 temporarily stores the binary code and transmits the binary code to a character composer 3 via a detecting means 4 for detecting an indication code for supplying a space character from among the binary codes inputted.

The detecting means 4 mentioned above keeps watch on the binary codes sequentially inputted, and transmits the detecting signal to a control means 8 via a transmitting line 10 at the time of detecting the indication code.

The indication code is provided with a unique binary code generally consisting of one byte.

The character composer 3 detects a Korean alphabet code corresponding to each of the Korean alphabet symbols from among the binary codes inputted, and generates a Korean character code corresponding to each of Korean characters in a conventional means which determines a combination of the Korean alphabet symbols detected to an output buffer 5, the Korean character code being a binary code generally consisting of two bytes.

The character composer 3 transmits the binary code as is to the output buffer 5 in a case of not detecting the Korean alphabet code.

The character composer 3 also has a first calculating means for calculating the number of Korean alphabet symbols and for storing the number in a counter 6, and a converting means for converting the number of Korean characters into the number of outputted units, each outputted unit having the size of the basic symbols; the number of outputted units are stored in a counter 7.

The counter 6 for storing the number of Korean alphabet symbols and the counter 7 for storing the number of outputted units are counters which sequentially add the inputted number to an initial or stored value.

The control means 8 for controlling a space supplying means 9 has a second calculating means for calculating the supplying number of space characters which subtract the number of the outputted units stored in the counter 7 from the number of Korean alphabet symbols stored in the counter 6, and an instructing means for instructing the space supplying means 9 to supply the space characters equivalent to the supplying number calculated by the second calculating means, the control means 8 being operated by the detecting signal which is transmitted from the detecting means 4 via the transmitting line 10.

The control means 8 also resets the counter 6 and the counter 7 via control lines 11 and 12 so as to store "0" as the initial value therein.

The space supplying means 9 outputs a space character code corresponding to the space character, the space character code being equivalent to the supplying number instructed by the control means 8 and supplies this number to the output buffer 5.

The output buffer 5 temporarily stores the binary codes from the character composer 3 and the space supplying means 9, and sequentially outputs the binary codes to an output device 13 such as a printer or a display.

In this first embodiment, although the character composer 3 has a converting means for converting the number of Korean characters into the number of outputted units corresponding to the size of the basic symbols and for storing the number of outputted units in the counter 7, the character composer 3 may alternatively have a calculating means for calculating the number of Korean characters and for storing the number of Korean characters in the counter 7 in a case of the control means 8 having a converting means for converting the number of Korean characters into the number of outputted units corresponding to the size of the basic symbols.

The character composer 3 mentioned in the first embodiment, contrary to the above case, may have a second calculating means for calculating the supplying number of the space characters, instead of the control means 8 having the second calculating means.

A flowchart of an apparatus for outputting a Korean character composed of Korean alphabet symbols which adjust the Korean character to a design or design alteration is illustrated in FIG. 3.

In a step 20, a binary code consisting of one byte is sequentially inputted by the inputting device 1 in FIG. 2 and the operation moves to a step 21.

The binary code is logically checked by the step 21 to find out whether or not it has a logical error such as the binary code being an abnormal code or out of the composition rules.

The step 21, in a case of detecting a logical error, instructs a step 22 to deal with the logical error so that the step 22 makes the output device 13 in FIG. 2 indicate that the binary code is a logical error, or the step 22 outputs the binary code to the output device 13 as is or else, if the code is logical, the step 21 proceeds to a step 23.

In the step 23, the binary code is checked to find out whether or not it is a Korean alphabet code. The step 23, if the binary code is judged to be a Korean alphabet code, causes the code to be transmitted to the character composer 3 in FIG. 2 and the step 23 informs a step 24 of judging the binary code to be the Korean alphabet code. The step 23, alternatively, proceeds to step 26 if the binary code is judged not to be a Korean alphabet code.

The step 24 adds one to an initial or stored value in a first counter for storing the number of Korean alphabet symbols when the step 24 is informed of that from the step 23.

A step 25 judges whether or not the character composer 3 has finished composing a Korean character.

The step 25, in a case of the character composer 3 having finished composing the Korean character, informs a step 27 of that; or alternatively, the step 25 advances to a step 30.

The step 27 calculates the supplying number of the space character by subtracting the number of outputted units from the number of Korean alphabet symbols, the number of the outputted units being converted to the number of Korean characters as a size of the Korean alphabet, and the step 27 adds the supplying number of the space character to an initial or stored value in a second counter for the supplying number of space characters. The step 27 also resets the first counter so as to store "0", as an initial value and thereafter advances to the step 30.

The step 26 judges whether or not the binary code transmitted from the step 23 is an indication code for supplying the space character, and thereafter transmits the binary code to the output buffer 5 in FIG. 2 via the character composer 3. The step 26, in a case of the binary code being the indication code, informs a step 28 of that; or alternatively, the step 26 advances to the step 30.

The step 28, informed from the step 26, instructs the space supplying means 9 in FIG. 2 to supply the space character equivalent to the supplying number stored in the second counter, and thereafter advances to a step 29.

The step 29 resets the second counter so as to store "0" as an initial value, and advance to the step 30.

The step 30 exercises control over the step 20, the control involving an instruction for inputting a binary code and for interrupting the inputting of a binary code.

Figure 4:
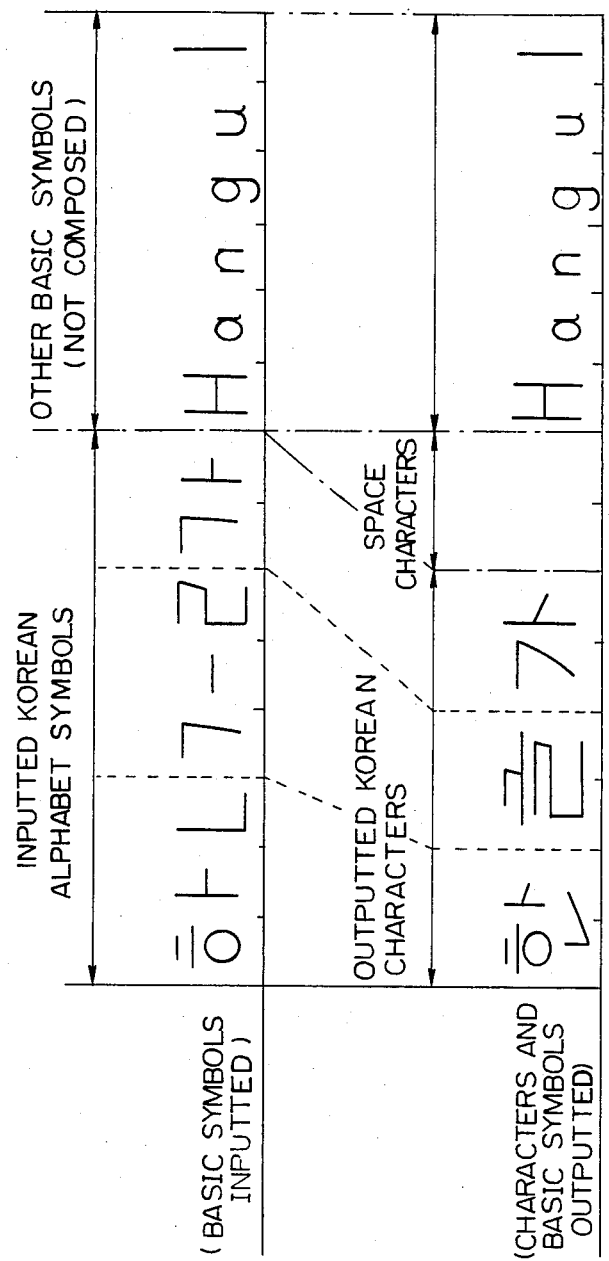
FIG. 4 illustrates the input data and the output data of above embodiment of the present invention.

It is possible to the apparatus according to the embodiments of the present invention as mentioned above to output data involving Korean characters, space characters and other basic symbols, the output data being in accordance with input data involving Korean alphabet symbols and the other basic symbols, as illustrated in FIG. 4.

In FIG. 4, the indication code mentioned above is inserted between the Korean alphabets codes and the other basic symbols; however, the indication code may be inserted in any portion in the input data which adjusts the input data with respect to outputted design or outputted design alteration.

What is claimed is:

1. An apparatus for outputting Korean characters respectively composed of a plurality of Korean alphabet symbols to an output device, comprising:
   an input device for sequentially inputting a plurality of binary code signals, said binary code signals representing Korean alphabet code signals and respectively designating the Korean alphabet symbols and an indication code signal for supplying a space character code signal;
   a detecting means for detecting the indication code signal from among the binary code signals;
   a first calculating means for calculating the number of Korean alphabet code signals inputted from the input device;
   a character composing means for composing Korean character code signals from the inputted Korean alphabet code signals, the Korean character code signals respectively designating Korean characters, the Korean character code signals being outputted to the output device;
   a second calculating means for calculating a supplying number of space character code signals, the supplying number being calculated by substracting the number of composed Korean character code signals from the inputted number of Korean alphabet code signals; and
   a supplying means for supplying a space character code signal to the output device, the number of space character code signals being equal to the supplying number, the supplying means supplying the space character code signal when the indication code signal is detected by the detecting the means.

2. An apparatus as recited in claim 1, wherein the first calculating means has a first counter for storing the inputted number of Korean character code signals.

3. An apparatus as recited in claim 2, wherein the second calculating means has a second counter for storing the supplying number of Korean character code signals.

4. An apparatus as recited in claim 3, wherein the detecting means transmits the detecting signal to the second calculating means when the detecting means detects the indication code, whereby the second calculating means calculates the supplying number after receiving the transmitted detecting signal.

5. An apparatus as recited in claim 4, wherein the second calculating means resets the first counter and the second counter when the second calculating means calculates the supplying number of space characters.

6. An apparatus as recited in claim 3, wherein the second calculating means has a third counter for storing the supplying number, the second calculating means calculating the supplying number each time that a Korean character is composed.

7. An apparatus as recited in claim 6, wherein the second calculating means resets the first counter and the second counter when the second calculating means calculates the supplying number of space characters.

8. An apparatus as recited in claim 7, wherein the detecting means transmits the detecting signal to the supplying means when the detecting means detects the indication code signal, whereby the supplying means supplies the space character code signal after receiving the transmitted detecting signal.

9. An apparatus as recited in claim 8, wherein the supplying means resets the third counter when the supplying means supplies the space character code signal.

10. An apparatus for outputting Korean characters together with alphanumeric letters to an output device, the font size of the Korean characters being a predetermined ratio with respect to the font size of the alphanumeric letters, the Korean characters being respectively composed of a plurality of Korean alphabet symbols, comprising:
    an input device for sequentially inputting a plurality of binary code signals, said binary code signals representing Korean alphabet code signals and respectively designating the Korean alphabet symbols and an indication code signal for supplying a space character code signal;
    a detecting means for detecting the indication code signal from among the binary code signals;
    a first calculating means for calculating the number of Korean alphabet code signals inputted from the input device;
    a character composing means for composing Korean character code signals from the inputted Korean alphabet code signals, the Korean character code signals respectively designating Korean characters, the Korean character code signals being outputted to the output device;
    a converting means for converting the number of character code signals into outputted unit numbers, the outputted unit numbers being equal to the number of character code signals multiplied by the predetermined ratio;
    a second calculating means for calculating a supplying number of space character code signals, the supplying number being calculated by subtracting the number of composed Korean character code signals from the inputted number of Korean alphabet code signals; and
    a supplying means for supplying a space character code signal to the output device, the number of space character code signals being equal to the supplying number, the supplying means supplying the space character code signal when the indication code signal is detected by the detecting means.

11. An apparatus as recited in claim 10, wherein the first calculating means has a first counter for storing the supplying number.

12. An apparatus as recited in claim 11, wherein the second calculating means has a second counter for storing the supplying number.

13. An apparatus as recited in claim 12, wherein the detecting means transmits the detecting signal to the second calculating means when the detecting means detects the indication code, whereby the second calculating means calculates the supplying number after receiving the transmitted detecting signal.

14. An apparatus as recited in claim 13, wherein the second calculating means resets the first counter and the second counter when the second calculating means calculates the supplying number of space characters.

15. An apparatus as recited in claim 12, wherein the second calculating means has a third counter for storing the supplying number, the second calculating means calculating the supplying number each time that a Korean character is composed.

16. An apparatus as recited in claim 15, wherein the second calculating means resets the first counter and the second counter when the second calculating means calculates the supplying number of space characters.

17. An apparatus as recited in claim 16, wherein the detecting means transmits the detecting signal to the supplying means when the detecting means detects the indication code signal, whereby the supplying means supplies the space character code signal after receiving the transmitted detecting signal.

18. An apparatus as recited in claim 17, wherein the supplying means resets the third counter when the supplying means supplies the space character code signal.

* * * * *